(12) United States Patent
Reed et al.

(10) Patent No.: US 11,801,993 B1
(45) Date of Patent: Oct. 31, 2023

(54) BULK MATERIAL DISPENSING SYSTEM

(71) Applicant: ABC Polymer Industries, LLC, Helena, AL (US)

(72) Inventors: Randy Reed, Helena, AL (US); Dean Leader, Helena, AL (US); Timothy Hartsell, Helena, AL (US); Denzil Schmitz, Helena, AL (US); Dylan Quick, Helena, AL (US); John Cook, Helena, AL (US); Matt Moody, Helena, AL (US); Arnar Thors, Helena, AL (US)

(73) Assignee: ABC POLYMER INDUSTRIES, LLC, Helena, AL (US)

( * ) Notice: Subject to any disclaimer, the term of this patent is extended or adjusted under 35 U.S.C. 154(b) by 0 days.

(21) Appl. No.: 16/409,378

(22) Filed: May 10, 2019

Related U.S. Application Data (60) Provisional application No. 62/670,535, filed on May 11, 2018.

(51) Int. Cl.
*B65D 88/54* (2006.01)

(52) U.S. Cl.
CPC .................................. *B65D 88/54* (2013.01)

(58) Field of Classification Search
CPC ........ B65D 88/54; B65D 88/64; B65D 88/66; B65D 88/68
USPC ............ 141/94, 95; 222/271, 281, 272, 636
See application file for complete search history.

(56) References Cited

U.S. PATENT DOCUMENTS

| | | | | |
|---|---|---|---|---|
| 382,973 | A * | 5/1888 | Groat | B02C 18/2283 241/159 |
| 771,137 | A * | 9/1904 | Frerking | A01C 15/16 222/281 |
| 912,628 | A * | 2/1909 | Sherman | B01F 3/1221 366/103 |
| 1,288,025 | A * | 12/1918 | Kennedy | A23G 1/206 222/280 |
| 1,845,847 | A * | 2/1932 | Reuther | B65D 88/64 222/459 |
| 2,188,717 | A * | 1/1940 | Jones | A47L 13/502 15/311 |
| 2,494,500 | A * | 1/1950 | Andres | B65G 53/00 406/60 |
| 2,550,354 | A * | 4/1951 | Jacobsen | E04F 21/12 406/65 |
| 2,676,694 | A * | 4/1954 | Wyss | B65G 65/00 198/534 |
| 2,989,252 | A * | 6/1961 | Babb | B02C 13/00 241/138 |
| 2,991,870 | A * | 7/1961 | Griffith | B65D 88/68 198/533 |
| 3,051,398 | A * | 8/1962 | Babb | B02C 19/0056 241/136 |

(Continued)

*Primary Examiner* — Timothy L Maust
(74) *Attorney, Agent, or Firm* — Joseph S. Bird, III; Maynard Nexsen PC (57) ABSTRACT

The present disclosure generally pertains to a dispensing system comprising an upper chamber capable of receiving a bulk material to be dispensed, a first set of finned shafts positioned within the upper chamber and capable of feeding bulk material into a lower chamber, and a second set of finned shafts positioned within the lower chamber and capable of dispensing a controlled dose of bulk material from the lower chamber.

15 Claims, 6 Drawing Sheets

(56) References Cited

U.S. PATENT DOCUMENTS

| | | | | |
|---|---|---|---|---|
| 3,145,882 A | * | 8/1964 | Quackenbush | B65D 88/68 222/269 |
| 3,189,327 A | * | 6/1965 | Dominifhetti | B28C 9/0436 366/39 |
| 3,225,963 A | * | 12/1965 | Arpajian | B01J 8/003 222/1 |
| 3,450,311 A | * | 6/1969 | Bonneric | A24C 5/39 131/108 |
| 3,504,621 A | * | 4/1970 | Qualheim | B02C 19/0081 100/96 |
| 3,529,870 A | * | 9/1970 | Woten | E04F 21/12 406/53 |
| 3,620,317 A | * | 11/1971 | Henry | B65B 1/32 177/54 |
| 3,807,646 A | * | 4/1974 | Leiter | B02C 13/06 241/154 |
| 3,915,248 A | * | 10/1975 | Paelian | G01G 21/23 177/210 R |
| 3,938,673 A | * | 2/1976 | Perry, Jr. | B28C 7/049 414/21 |
| 4,189,240 A | * | 2/1980 | Scheppele | A23N 17/007 366/186 |
| 4,204,773 A | * | 5/1980 | Bates | B28C 9/00 366/18 |
| 4,363,428 A | * | 12/1982 | Kruger | B65D 88/68 222/227 |
| 4,411,390 A | * | 10/1983 | Woten | B65G 53/4633 406/64 |
| 4,465,239 A | * | 8/1984 | Woten | B65G 53/46 241/159 |
| 4,619,381 A | * | 10/1986 | Wurtz | B65D 88/68 366/85 |
| 4,766,648 A | * | 8/1988 | Kerley | D01B 1/04 19/80 R |
| 4,767,029 A | * | 8/1988 | Cascione | B29C 48/37 366/300 |
| 4,953,795 A | * | 9/1990 | Bielagus | D21B 1/02 241/159 |
| 5,176,295 A | * | 1/1993 | Stefanik | B65D 88/68 222/281 |
| 5,201,473 A | * | 4/1993 | Pollock | B01F 33/502 241/36 |
| 5,527,373 A | * | 6/1996 | Chareyre | C05F 17/964 71/21 |
| 5,785,421 A | * | 7/1998 | Milek | B28C 7/0486 366/16 |
| 5,788,163 A | * | 8/1998 | Woten | B05B 7/1409 358/1.14 |
| 5,829,649 A | * | 11/1998 | Horton | B02C 13/288 406/135 |
| 6,109,488 A | * | 8/2000 | Horton | E04F 21/12 406/137 |
| 6,161,784 A | * | 12/2000 | Horton | A01C 15/007 239/650 |
| 6,293,689 B1 | * | 9/2001 | Guntert, Jr. | B28C 7/0495 366/2 |
| 6,758,590 B1 | * | 7/2004 | Black | B03B 9/063 366/601 |
| 6,889,874 B2 | * | 5/2005 | Vohwinkel | B65D 88/32 222/198 |
| 7,159,809 B1 | * | 1/2007 | Cheng | B02C 4/08 241/101.2 |
| 7,257,935 B1 | * | 8/2007 | Wehrmann | B65B 37/08 53/139.5 |
| 7,293,585 B2 | * | 11/2007 | Mahoney | B65B 69/0083 141/114 |
| 9,481,511 B2 | * | 11/2016 | Yu | B01F 27/073 |
| 9,731,255 B2 | * | 8/2017 | Black | B01F 15/0234 |
| 9,963,293 B2 | * | 5/2018 | Pleima | A01F 25/2018 |
| 10,287,091 B2 | * | 5/2019 | Allegretti | B65D 90/587 |
| 2004/0184889 A1 | * | 9/2004 | Rexius | B60P 1/60 406/42 |
| 2005/0219941 A1 | * | 10/2005 | Christenson | B01F 35/71775 366/18 |
| 2009/0057350 A1 | * | 3/2009 | Lin | A01C 15/007 222/636 |
| 2009/0238031 A1 | * | 9/2009 | Conard | B01F 13/1055 366/162.2 |
| 2013/0327277 A1 | * | 12/2013 | Aton | A01K 5/002 119/57.92 |

\* cited by examiner

BULK MATERIAL DISPENSING SYSTEM

STATEMENT REGARDING RELATED APPLICATIONS

This application claims priority to and the full benefit of U.S. Provisional Patent Application No. 62/670,535 entitled "Bulk Fiber Dispenser," and filed on May 11, 2018, which is incorporated herein by reference in its entirety.

TECHNICAL FIELD

This disclosure relates generally to dispensing structures and methods, and more particularly to a chambered dispensing system for bulk material and methods for operating the system.

BRIEF DESCRIPTION OF THE DRAWINGS

The bulk material dispensing system can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

A dispensing system and methods of operation are provided for receiving bulk material and dispensing a controlled dose of the bulk material from the system for mixing into another material, or for other purposes. The bulk material may be received and held in a chamber and dispensed from the chamber in one or more stages. Additional chambers may be used in the dispensing of the bulk material. The chamber may be a hopper or any other container suitable for receiving bulk material. The chamber may be composed of metal or any other material suitable for receiving, holding, and dispensing bulk material. In one embodiment, the bulk material comprises synthetic fibers and optionally other additives which may be added to concrete during the mixing process to prevent the formation of cracks during curing or any temperature-related shrinkage of the concrete. The bulk material may be mixed into other materials.

Figure 1A:
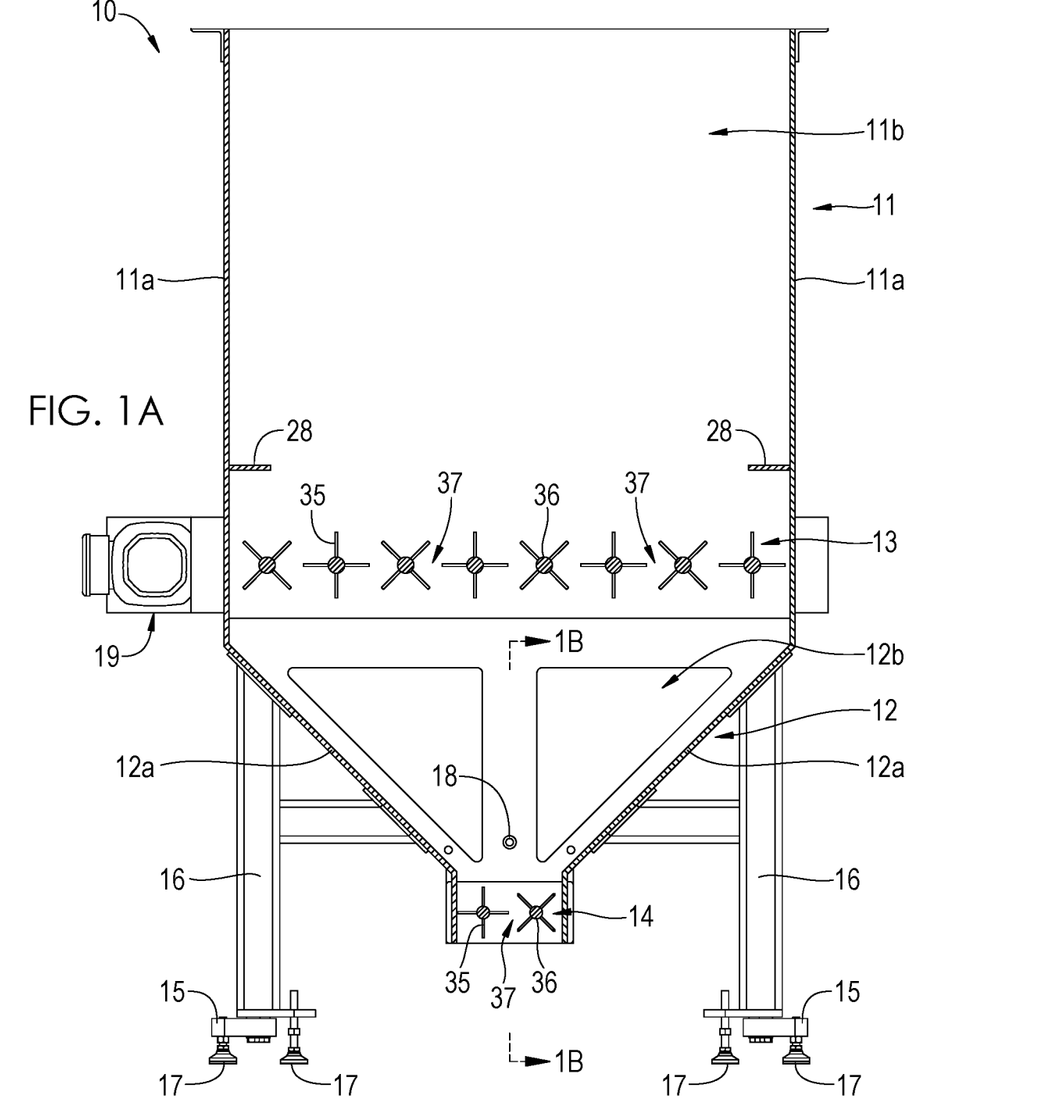
FIG. 1A is a sectional view of one embodiment of a dispensing system depicting one end of each of the first and second set of finned shafts of the upper and lower chambers.

In one embodiment, as shown in FIG. 1A, the dispensing system 10 comprises an upper chamber 11 comprising vertical and/or sloping walls 11a defining an upper volume 11b and a lower chamber 12 comprising at least one vertical and/or sloping walls 12a defining a lower volume 12b. Herein, description of the walls 11a, 12a as interior or exterior walls means only the exterior or interior side of a wall of the upper or lower chamber 11, 12. In one embodiment, funnel walls 11c may be connected to or integral near or at the top of one or more of the vertical walls 11a. Although the embodiment of the upper and lower chambers 11, 12 depicted in the figures are rectangular prisms, the shape of each chamber may be selected from the group consisting of polygons having any number of walls, ovals, or cylinders. As described more fully herein, the upper chamber 11 is connected with or integral to the lower chamber 12 such that the upper chamber 11 is positioned above the lower chamber 12. A first set of finned shafts 13 is positioned near a lower interior portion of the upper chamber 11 and the finned shafts 13 operate such that bulk material may be fed from the upper chamber 11 into the lower chamber 12 with the assistance of gravity. A second set of finned shafts 14 is positioned near a lower section of the lower chamber 12, such that a controlled dose of the bulk material can be dispensed from the lower chamber 12. In a preferred embodiment, the second set of finned shafts 14 is positioned in a narrowed lower section of the lower chamber 12. As bulk material is dispensed from the lower chamber 12 by the second set of finned shafts 14 and evacuated from the dispensing system 10, load cells 15 in one embodiment near the base of legs 16 of the dispensing system 10 measure the corresponding reduction in weight of the bulk material, which can be output as a signal to the control system 40. The upper volume 11b is positioned above the lower volume 12b so that the bulk material moves downwardly not only by the action of the finned shafts but also by gravity.

Figure 2:
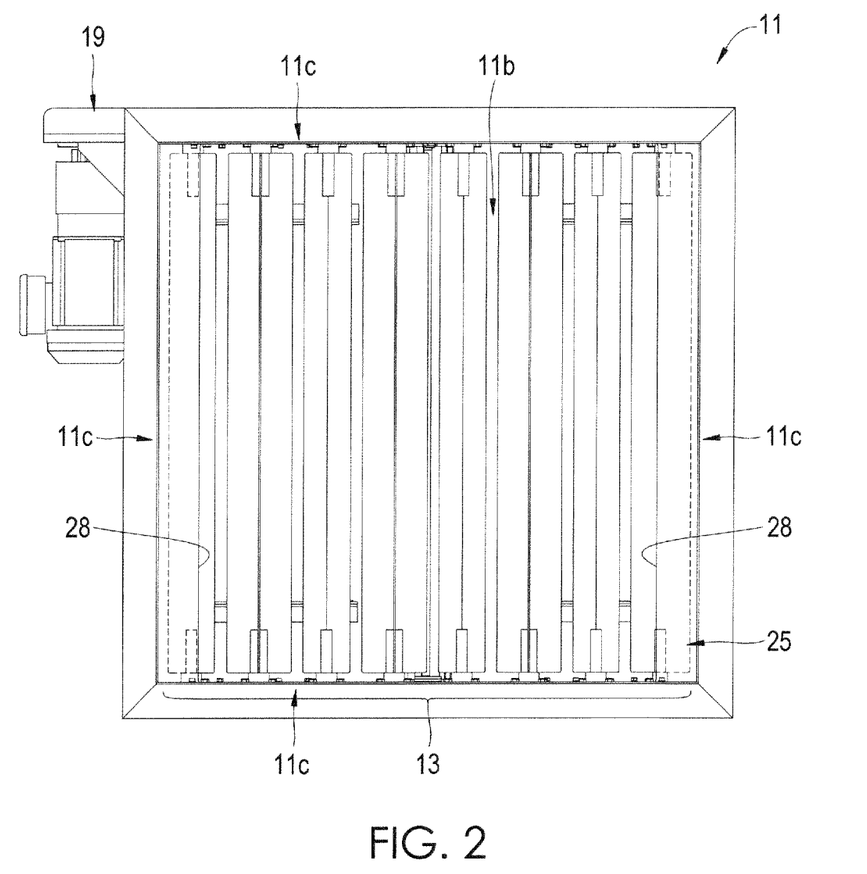
FIG. 2 is a top view of the embodiment of the dispensing system of FIG. 1 showing the funnel walls, the first set of finned shafts and its drive assembly.
Figure 3:
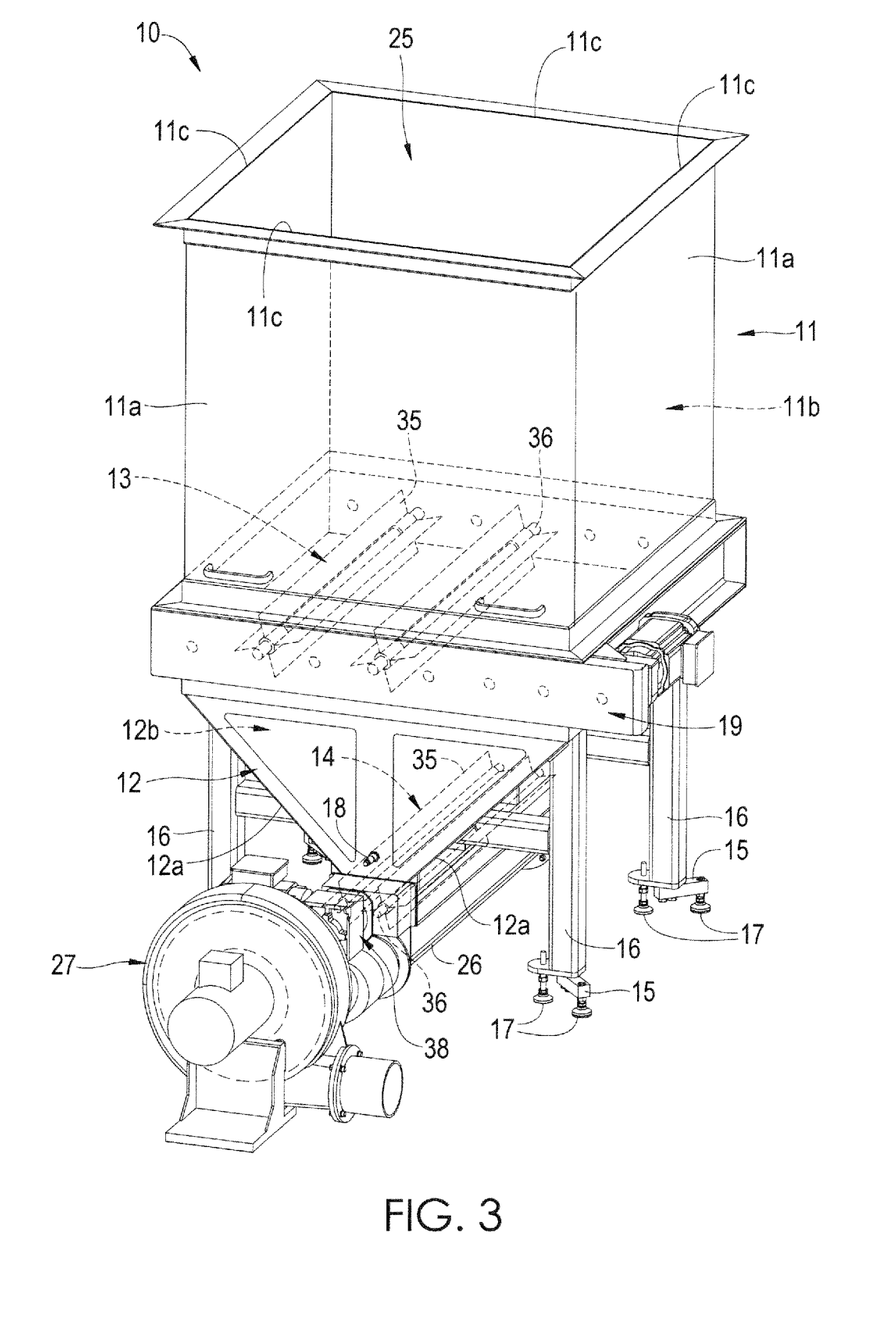
FIG. 3 is a perspective view of the embodiment of the dispensing system of FIG. 1, with dotted line depictions of two of eight of the finned shafts of the first set, and the two finned shafts in the second set.

In reference to FIGS. 2-3, the upper chamber 11 comprises a bulk material entrance 25 through which bulk material may be received into the upper chamber 11. The bulk material entrance 25 of the upper chamber 11 may be open to the immediate surroundings or may comprise a lid, door, or other suitable cover or sealing structure. The bulk material entrance 25 of the upper chamber 11 may be of any shape and size conducive to the efficient movement of bulk material into the upper chamber 11. In one embodiment, the bulk material entrance 25 to the upper chamber 11 is an open top face of the upper chamber 11. In one embodiment, the upper chamber 11 comprises a grate or other suitable filtering structure located approximately 6 inches below the bulk material entrance 25 and oriented horizontally across the upper chamber 11 such that bulk material may be loaded into the upper chamber 11 in a controlled manner and such that any aggregates of bulk material are prevented from impacting or damaging the first set of finned shafts 13.

The upper chamber 11 may be connected to the lower chamber 12 with any suitable connective hardware or using any additional attachment means known in the art. In a preferred embodiment, the upper chamber 11 may be connected to the lower chamber 12 by at least one connecting bracket and bolts. In one embodiment, the upper chamber 11 may be of unitary construction with and integral to the lower chamber 12.

In one embodiment, at least one plate 28 is located within the upper chamber 11 and positioned on the interior of at least one wall 11a directly above the first set of finned shafts 13, such that the at least one plate 28 is capable of blocking bulk material from entering the space between the finned shafts nearest the at least one wall 11a and the at least one wall 11a of the upper chamber 11. The at least one plate 28 may be horizontal or sloped downward from the point where it is attached to the wall 11a. The at least one plate 28 may horizontally extend from the at least one wall 11a to approximately the middle of the finned shaft nearest the at least one wall 11a.

In one embodiment, the upper chamber 11 comprises at least one pair of fork brackets or other suitable slot or handle positioned on at least one wall 11a of the upper chamber 11. The fork brackets are located on the interior of at least one wall 11a of the upper chamber 11 and oriented such that a forklift may be inserted into the brackets from the bulk material entrance 25 of the upper chamber 11. To remove the upper chamber 11 from the lower chamber 12, connective hardware may be removed and a forklift may be employed to lift and remove the upper chamber 11. Optionally, at least one pair of fork brackets or slots may be positioned on at least one wall 12a of the lower chamber 12 such that the lower chamber 12 may be lifted and removed using a forklift.

The first set of finned shafts 13 and the second set of finned shafts 14 may each comprise at least two finned shafts. In one embodiment, the first set of finned shafts 13 comprises more finned shafts than the second set of finned shafts 14. Each set of finned shafts can operate independently of or in tandem with the other according to one or more algorithms programmed with software in the control system 40. In one embodiment, the first set of finned shafts 13 comprises fins 35 of the same size as the fins 35 of the second set of finned shafts 14. In another embodiment, the first set of finned shafts 13 comprises fins 35 smaller than the fins 35 of the second set of finned shafts 14. In a preferred embodiment, the first set of finned shafts 13 comprises fins 35 larger than the fins 35 of the second set of finned shafts 14. The first set of finned shafts 13 comprise fins 35 that in one embodiment protrude approximately 5 inches from the shaft 36 and the second set of finned shafts 14 comprise fins 35 that protrude approximately 2.5 inches from the shaft 36. As an optional alternative to fins 35, first and second set of finned shafts 13, 14 may comprise paddles, rakes, or any suitable tool or fitting for dispensing bulk material.

Figure 4:
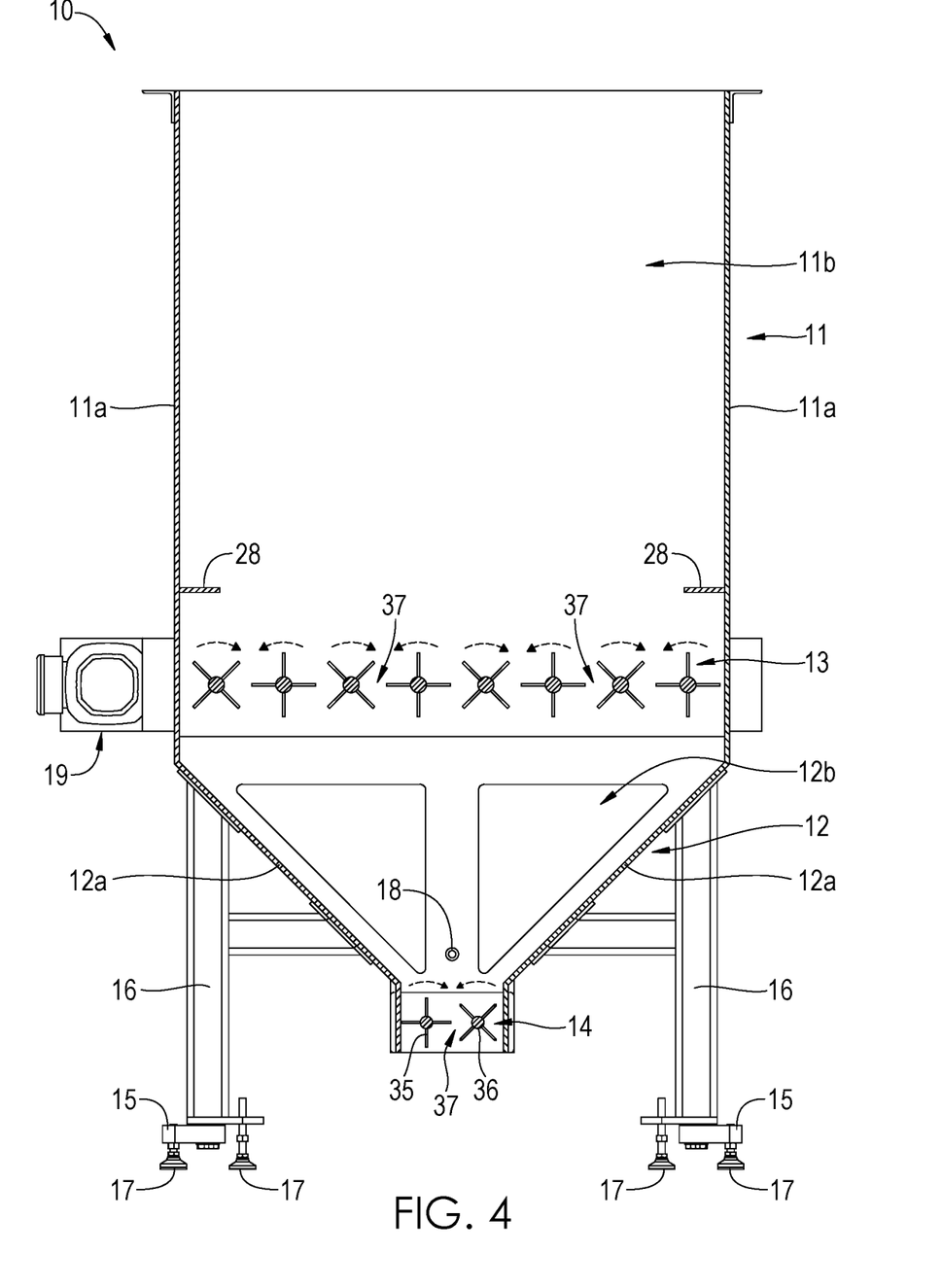
FIG. 4 is a sectional view of the embodiment of the dispensing system of FIG. 1 showing an example of the counter-rotational direction of the finned shafts, and the position of the fins on one shaft relative to fins of the adjacent finned shaft.

As detailed in FIG. 4, the first set of finned shafts 13 rotate in order to dispense bulk material from upper chamber 11 into lower chamber 12. In one embodiment, four fins 35 are on each shaft 36 in the first and second set of finned shafts 13, 14, but this number may vary depending on the size of the dispensing system and other variables. The rotational direction of the first set of finned shafts 13 may be counter-rotating with respect to adjacent finned shafts, as the counter-rotation is shown by the dotted line arcs and arrowheads in FIG. 4. Counter-rotation is defined as the rotation of one structure in a first direction opposite to a second direction of an adjacent rotating structure. For example, counter-rotation may involve the clockwise rotation of one finned shaft and the counter-clockwise rotation of any adjacent finned shafts, or vice versa. Each fin 35 of the first set of finned shafts 13 is separated from its adjacent fin 35 on the same shaft 36 by an inter-fin space 37, and all inter-fin spaces 37 are substantially the same as the fins 35 are spaced evenly on the shaft 36. As the finned shafts rotate, the fins 35 and inter-fin spaces 37 of a single shaft 36 rotate opposite the fins 35 and inter-fin spaces 37 of an adjacent finned shaft. During rotation each inter-fin space 37 is bisected momentarily in one position by one of the fins 35 of an adjacent finned shaft, as shown in FIG. 1A, such that bulk material is prevented from becoming entrapped between rotating fins 35 and such that fins 35 are prevented from jamming during operation. In one embodiment, each of the finned shafts 13 oscillate synchronously between rotational directions when dispensing bulk material. In one embodiment, the fins 35 of the first set of finned shafts 13 oscillate synchronously between rotational directions after each rotation of approximately 90 degrees to approximately 180 degrees when dispensing bulk material. In one embodiment, the fins 35 of the first set of finned shafts 13 oscillate synchronously between rotational directions after each rotation of approximately 135 degrees when dispensing bulk material.

The second set of finned shafts 14 rotate in order to dispense a controlled dose of bulk material from the lower chamber 12. In one embodiment, the rotational direction of the second set of finned shafts 14 may also be counter-rotating with respect to adjacent finned shafts, as shown by the dotted line arcs and arrowheads in FIG. 4. Each fin 35 of the second set of finned shafts 14 is also separated from its adjacent fin 35 by an inter-fin space 37, all of which inter-fin spaces 37 are substantially the same as the fins 35 are spaced evenly on the shaft 36. As the finned shafts rotate, the fins 35 and inter-fin spaces 37 of a single shaft 36 rotate opposite the fins 35 and inter-fin spaces 37 of an adjacent finned shaft. During rotation each inter-fin space 37 is bisected momentarily in one position by one of the fins 35 of an adjacent finned shaft, as shown in FIG. 1A, such that bulk material is prevented from becoming entrapped between rotating fins 35 and such that fins 35 are prevented from jamming during operation. In one embodiment, the first or second set of finned shafts 13, 14 rotate the fins 35 intermittently when dispensing bulk material. In a preferred embodiment, the second set of finned shafts 14 continuously counter-rotate the fins 35 with respect to adjacent fins 35 when dispensing bulk material.

Figure 1B:
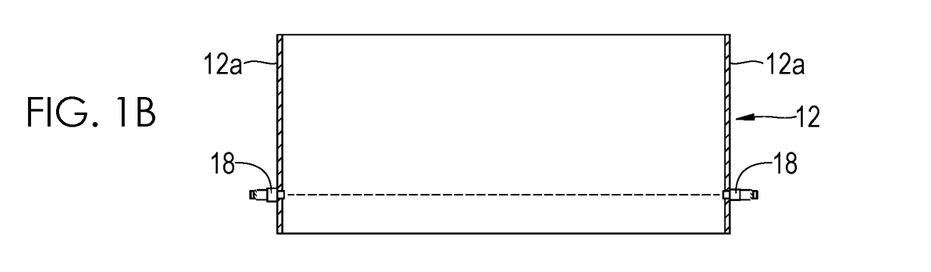
FIG. 1B is a section view at the line defined by points 1B showing one embodiment for the position for sensors to measure the level of bulk material in the lower chamber.

Operation of the first set of finned shafts 13 is controlled to dispense a required amount of bulk material from the upper chamber 11 into the lower chamber 12. The required amount of bulk material to be dispensed into the lower chamber 12 may be directly determined manually by an operator or by a control system 40 with pre-set or programmable parameters and algorithms. In one embodiment, the required amount of bulk material to be dispensed into the lower chamber 12 is determined by sensing a level of bulk material within the lower chamber 12. As shown in FIG. 1B, the sensing of the bulk material level in the lower chamber 12 may be achieved using at least one sensor 18 within the lower chamber 12, for example, at least one photo eye sensor. The at least one sensor 18 may be selected from a group consisting of vibrational sensors, rotating paddle sensors, admittance-type sensors, or level-indicating sensor. The at least one sensor 18 may be located on the interior of a vertical and/or sloping wall 12a of the lower chamber 12 or at any other appropriate location near the lower chamber 12 such that the level of bulk material within the lower chamber 12 may be determined. In one embodiment the sensor 18 is a photo eye sensor relying on a beam of light to determine when bulk material is blocking the beam, for example, when the bulk material reaches a certain height which may be varied according to different variables, for example, the particular design of the lower chamber 12 and the rate at which the second set of finned shafts 14 rotate. The at least one sensor 18 sends a first output signal to a control system 40, which is capable of controlling the operation of the first set of finned shafts 13 according to the sensed level of bulk material within the lower chamber 12, as detailed further below.

Operation of the second set of finned shafts 14 may be determined manually by an operator or automatically by a control system 40. In a preferred embodiment, operation of the second set of finned shafts 14 is based on a second output signal sent by the load cells 15 to a control system 40. The load cells 15 may be located in any position such that they may accurately measure the reduction in weight of the system as bulk material is dispensed from the lower chamber 12 using the second set of finned shafts 14. In one embodiment, the load cells 15 are located at the base of legs 16. In one embodiment, each load cell 15 may be balanced such that second output signal from each load cell 15 is approximately equal. In a preferred embodiment, a leveling foot 17 on each load cell 15 is adjusted such that the second output signal of each load cell 15 is approximately equal. Optionally, the second output signal from each load cell 15 may be unequal. Balancing of load cells 15 is undertaken to prevent an individual load cell 15 from carrying a weight greater than it is designed to carry. However, unbalanced load cells 15 are capable of providing appropriate output signal when no individual load cell 15 is carrying a weight greater than it is designed to carry. The appropriate weight limitations for each load cell 15 may be determined according to the manufacturer's instructions. The second output signal from each load cell 15 may be summed and averaged by the control system 40 to account for any unbalanced load cells, as detailed below. Second output signal includes pulses such as digital state changes, TCP/IP signal via Ethernet cable, and analog signal. In one embodiment, the second output signal from the load cells 15 is analog signal with decreasing voltage as bulk material is dispensed and measured weight is reduced.

Figure 5:
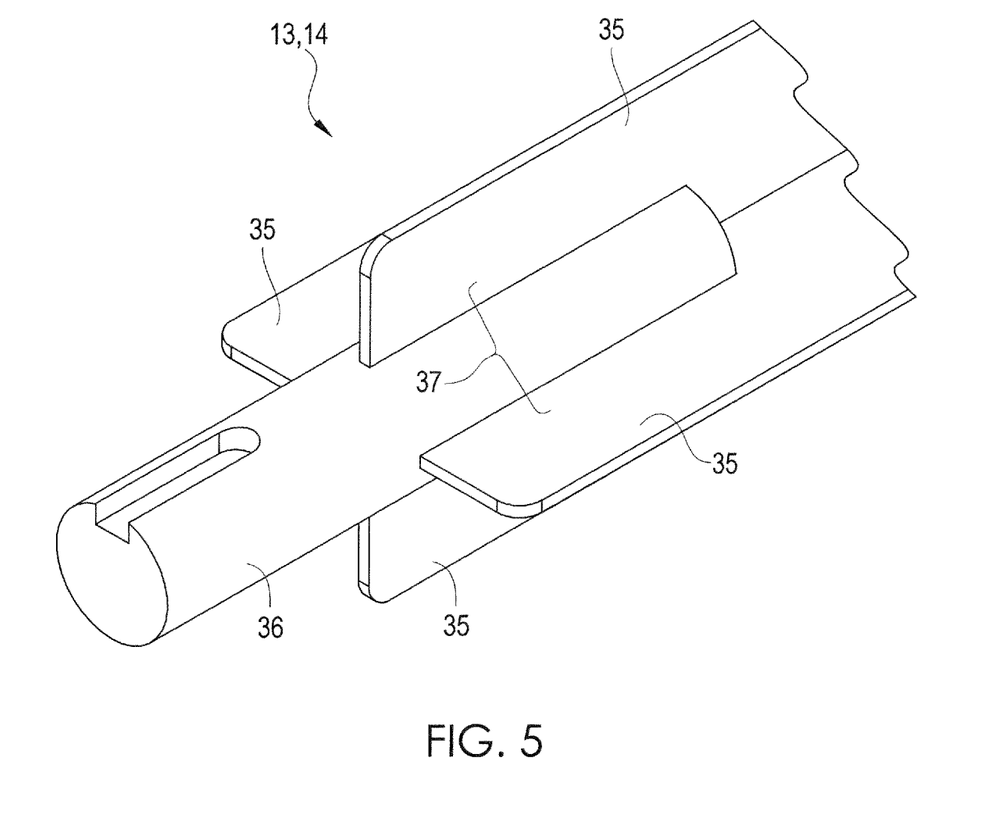
FIG. 5 is a perspective view of an end portion of one of the finned shafts of FIG. 1.

The first set of finned shafts 13 and the second set of finned shafts 14 may be constructed in one embodiment as detailed in FIG. 5, which is a portion of the end of a finned shaft 13, 14. The fins 35 of the first set of finned shafts 13 and the fins 35 of the second set of finned shafts 14 may be constructed in the same manner. In this embodiment, each fin 35 is fitted into position in a corresponding bore in a shaft 36. Any other suitable means of securing known in the art may be employed to secure fins 35 into the shaft 36. There may be at least two fins 35 attached to the shaft 36 and the fins 35 may be spaced around the shaft 36 in positions equidistant from each other. In one embodiment (not depicted), the first set of finned shafts 13 and the second set of finned shafts 14 may be constructed using additional structures and methods. The additional structures may comprise a shouldered shaft that is inserted into a fin weldment from an outside facing end of the fin weldment. To secure the fin weldment, the finned shaft may be rotated such that a dowel hole on the fin weldment is aligned with a dowel hole on the shaft 36. The dowel holes may be aligned beneath and secured by a retaining pin. The dowel hole may be an approximately 6 mm diameter dowel hole. The retaining pin may be inserted into the aligned holes and further secured with a retaining ring. Any other suitable means of securing known in the art may be employed to secure the fin weldment. Other means known in the art may be used to construct the first and second set of finned shafts 13, 14.

In one embodiment, the first set of finned shafts 13 is driven by a first belt connected to a first drive assembly 19. The first belt may be an approximately 610 mm circumference, approximately 22 mm width T5 belt. The first belt is tensioned by loosening the locking bolt on the belt tensioner bracket and rotating the tensioner assembly to take up the slack in the first belt. At least one spur gear may be positioned on the side opposite the belt drive on the first set of finned shafts 13 such that the shafts 36 are driven to rotate. In one embodiment the average speed of the motor driving the first set of finned shafts 13 is approximately 50 rpm. The speed of this motor may be driven by the control system 40 and may depend on set points in a program, as detailed below. Operating profiles for the first set of finned shafts 13 may differ for different bulk materials. In one embodiment, the motor of the first drive assembly 19 may be operated in reverse mode, wherein the motor reverses the rotational direction of the first set of finned shafts 13 such that any bulk material jammed within the first set of finned shafts 13 may be removed. The operation of reverse mode may be automatically initiated in the event that rotation of the first set of finned shafts 13 has ceased for a set amount of time without direction to do so by the control system 40. In one embodiment, the second set of finned shafts 14 is driven by a second drive assembly 38. The second drive assembly 38 may comprise a second motor, wherein the second set of finned shafts 14 are connected directly to the second motor. In one embodiment, the second drive assembly 38 may further comprise a second belt of a suitable circumference and width such that it may drive the second set of finned shafts 14. The second belt may be tensioned in a similar manner to the first belt. In this embodiment, the second set of finned shafts 14 is driven to rotate by at least one spur gear on the side opposite the belt drive on the second set of finned shafts 14. Operating profiles for the second set of finned shafts 14 may differ for different bulk materials. Belt covers may be positioned over the first and second drive assemblies 19, 38 and motor shaft. A gear cover may be positioned over any gears such that dust is prevented from accumulating in the gears and injury is prevented during operation.

In one embodiment, the second set of finned shafts 14 dispenses a controlled dose of bulk material from the lower chamber 12 into an exit chute 26. The exit chute 26 is located below the second set of finned shafts 14 such that the controlled dose of bulk material may be received. In one embodiment, a vacuum assists the dispensing of bulk material into the exit chute 26. The vacuum source may be a centrifugal fan within a housing 27 or other suitable source of vacuum. The vacuum source may be controlled by an operator or by the control system 40 based on the second output signal from the load cells 15, as detailed below. In one embodiment, the bulk material in the exit chute 26 may be evacuated by the centrifugal fan 27. The centrifugal fan 27 is positioned adjacent to the exit chute 26 such that bulk material may be evacuated from the exit chute 26 into a receiving vessel. The centrifugal fan 27 may be controlled by an operator or by the control system 40 based on the second output signal from the load cells 15, as detailed below. The evacuation may be undertaken such that dispensed bulk material immediately exits the exit chute 26 and does not accumulate in the exit chute 26. In one embodiment, the receiving vessel for the dispensed bulk material is a mixing vessel. In a preferred embodiment, the receiving vessel is a concrete ready mix truck and the bulk material is synthetic fibers.

In one embodiment, the dispensing system 10 is operated in standalone mode. In standalone mode, an operator or control system 40 selects the type of bulk material to be dispensed and the amount of bulk material to be dispensed. Additional operating parameters may be controlled by the operator or control system 40. The dispensing system 10 may operate in standalone mode with a self-contained programmable logic control system 40 (PLC). To initiate operation of the dispensing system 10, the operator may activate a start mechanism using a start button on an HMI (human machine interface) screen, through the control system 40, or through any other suitable initiation interface. After initiation, the dispensing system 10 continues to operate until the required amount of bulk material has been dispensed, as detailed below. The dispensing system 10 automatically stops dispensing bulk material when the required amount of bulk material has been dispensed.

In one embodiment, the dispensing system 10 is integrated into a plant batch control center 43 for operation through the latter's interface with the control system 40. When the dispensing system 10 is operated in a plant batch mode, the current weight of the dispensing system 10 may be output as a 0 to 10 VDC output signal, or second output signal, such that the plant batch control center 43 controls the operating parameters to dispense a desired amount of bulk material, as detailed further below. The dispensing system 10 may be configured to be controlled by outside plant batch control centers 43, including systems manufactured and sold, such as Command Alkon and Jonel. Other suitable outside systems known in the art may be configured to control the dispensing system 10. Such outside plant batch control centers 43 may be used to initiate the dispensing system 10, stop the dispensing system 10, or control the speed at which the bulk material is dispensed. A plant batch control center 43 may control any operation parameter of the dispensing system 10 such that a required amount of bulk material is adequately dispensed.

Figure 6A:
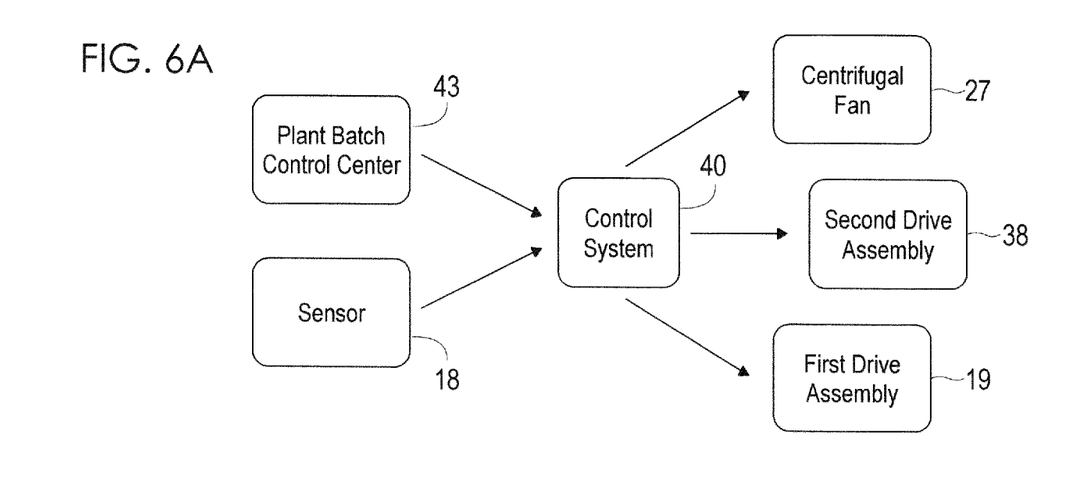
FIG. 6A is a block diagram illustrating initiation of the dispensing system by the control system for one embodiment of the dispensing system.

As displayed in FIG. 6, the control system 40 receives signals that convey the operational status of the dispensing system 10 and sends commands to various components of the dispensing system 10 in response to these signals and operator input parameters. In one embodiment, to initiate operation of the dispensing system 10, as shown schematically in FIG. 6A, a plant batch control center 43 may be programmed or directed by an operator to send a start signal to the control system 40 which is configured to receive the signal. The control system 40 may first direct the initiation of the motor of the centrifugal fan 27. The control system 40 may delay initiation of further components until the motor of the centrifugal fan 27 reaches a designated speed. The designated speed may be selected manually by an operator using an HMI screen or may be programmed to vary depending on the identity and volume of bulk material to be dispensed. The designated speed of the motor of the centrifugal fan 27 may vary with other operational parameters, as necessary to dispense the bulk material. After the centrifugal fan 27 had been initiated, the control system 40 may initiate the second drive assembly 38, which operates the second set of finned shafts 14. In one embodiment, the control system 40 will continue to signal the operation of the second drive assembly 38 when the at least one sensor 18 is activated. The activation of the at least one sensor 18 occurs when the level of bulk material in the lower chamber 12 is at or greater than the height of the at least one sensor 18. In one embodiment, the control system 40 will initiate the operation of the first drive assembly 19, which drives the first set of finned shafts 13, when the at least one sensor 18 is deactivated. The deactivation of the at least one sensor 18 occurs when the level of bulk material in the lower chamber 12 falls below the height of the at least one sensor 18. In one embodiment, the at least one sensor 18 is a photo eye sensor and is activated when the bulk material in the lower chamber 12 blocks the beam of light from the at least one set of photo eye sensors. In one embodiment, the at least one sensor 18 is a photo eye sensor and is deactivated when no bulk material in the lower chamber 12 blocks the beam of light from the at least one set of photo eye sensors. Optionally, the control system 40 may initiate the operation of components of the dispensing system 10 prior to the motor of the centrifugal fan 27 reaching its designated speed.

Figure 6B:
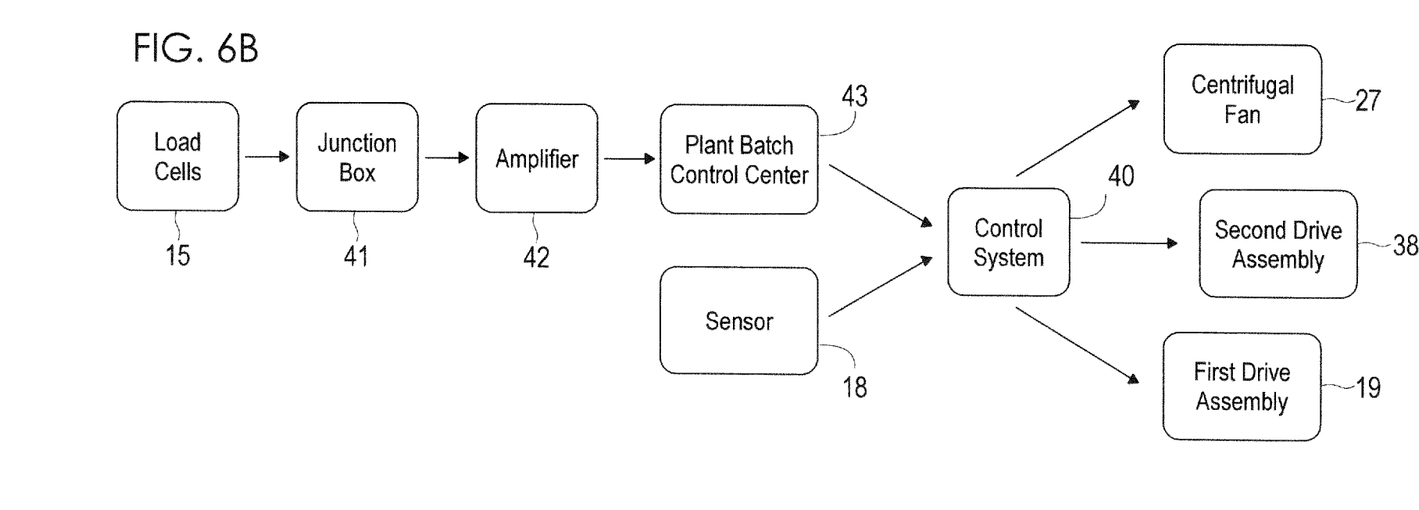
FIG. 6B is a block diagram illustrating the continued operation and ceasing of operation of the dispensing system by the control system for one embodiment of the dispensing system.

As shown in FIG. 6B, the control system 40 may increase or reduce the rate of dispensing or cease the operation of the dispensing system 10 in response to received signals from components of the dispensing system 10, operator input, or plant batch control center 43 input. The dispensing rate of the first and second set of finned shafts 13, 14 and the operation of the dispensing system 10 as a whole may be determined from both a first output signal from at least one sensor 18 in the lower chamber 12 and from a second output signal originating from the load cells 15.

In one embodiment, the at least one sensor 18 may be deactivated when the level of bulk material in the lower chamber 12 is below the height of the at least on sensor 18. When it is deactivated, the at least one sensor 18 will send a first output signal to the control system 40, and the control system 40 may initiate or continue to prompt the operation of the first drive assembly 19 controlling the rotation of the first set of finned shafts 13. When the at least one sensor 18 is deactivated, the first set of finned shafts 13 may dispense or continue to dispense bulk material into the lower chamber 12 until the control system 40 directs the reduction of the dispensation rate or ceases the operation of the first drive assembly 19. In one embodiment, the at least one sensor 18 may be activated when the level of bulk material in the lower chamber 12 is at or above the height of the at least one sensor 18. When it is activated, the at least one sensor 18 will send a first output signal to the control system 40, and the control system 40 may direct the reduction in speed or cease the operation of the first drive assembly 19 controlling the rotation of the first set of finned shafts 13. When the at least one sensor 18 is activated, the first set of finned shafts 13 may cease dispensing or reduce the rate of dispensing bulk material into the lower chamber 12.

In one embodiment, the load cells 15 may each output a signal that corresponds to the load sensed by each load cell 15. In one embodiment, the signal may be an approximately 0-30 mV output signal that is proportional to the weight of the dispensing system 10 and bulk material sensed by each load cell 15. In one embodiment, the dispensing system 10 weight is tared prior to the addition of bulk material to the dispensing system 10. The taring may be initiated by an operator using a button, switch, or other initiation device on the HMI screen or related apparatus. In one embodiment, the approximately 0-30 mV output signal from each load cell 15 is sent to a junction box 41, which may calculate the average output signal from the load cells 15. In one embodiment, the average 0-30 mV output signal is sent from the junction box 41 to an amplifier 42 which may convert the approximately 0-30 mV output signal to an approximately 0-10 V output signal. In one embodiment, the amplifier 42 may send the approximately 0-10 V output signal to a plant batch control center 43, which determines the weight of the bulk material in the upper and lower chambers 11, 12 of the dispensing system 10. The plant batch control center 43 may calculate the bulk material weight from the approximately 0-10 V output signal and the tare weight of the dispensing system 10. In one embodiment, the calculation of the bulk material weight comprises multiplying the maximum weight capacity of the load cells 15 by the number of load cells 15, multiplying this number by the ratio of the approximately 0-10 V output signal to the maximum output signal, and subtracting the tare weight from this number. For example, if four load cells 15 with a 300 pound maximum weight capacity send an average converted output signal of 5 V out of a maximum 10 V and the tare weight of the unladen dispensing system 10 is 400 pounds, the weight of the bulk material at the time of measurement would be 300 pounds multiplied by four load cells 15, multiplied by the ratio of 5 V to 10 V, and subtracted by 400 pounds, or a bulk material weight of 200 pounds. In one embodiment, each 0-10 V output signal sent to the plant batch control center 43 is a pulse. The pulse may represent an incremental loss of bulk material weight as the dispensing system 10 is operating. The plant batch control center 43 may be configured to count the amount of pulses it receives to determine the amount of bulk material that has been dispensed. The pulse resolution by the plant batch control center 43 may be input by an operator using a HMI screen or other related apparatus and may assign a bulk material weight per pulse. For example, the plant batch control center 43 will determine that 40 ounces of bulk material have been dispensed after 10 pulses have been received with a pulse resolution parameter of 4 ounces of bulk material per pulse.

In one embodiment, the plant batch control center 43 sends the measured weight of the bulk material in the upper and lower chambers 11, 12 to the control system 40 as a second output signal. The control system 40 determines the operation of the centrifugal fan 27, first drive assembly 19, and second drive assembly 38 based on the amount of bulk material that remains to be dispensed. In one embodiment, the first and second drive assemblies 19, 38 may be operated at a high speed or at a reduced speed. In one embodiment, the control system 40 may direct the operation of the first and second drive assemblies 19, 38 at a reduced speed when a certain amount of bulk material has been dispensed. The amount of bulk material to be dispensed before the first and second drive assemblies 19, 38 are operated at a reduced speed may be determined by an operator using an HMI screen or other related apparatus. In one embodiment, when a certain number of pulses have been received by the plant batch control center 43, the control system 40 will direct the operation of the first and second drive assemblies 19, 38 at a reduced speed. In one embodiment, the control system 40 may cease the operation of the first and second drive assemblies 19, 38 when the appropriate weight of bulk material has been dispensed. The total weight of bulk material to be dispensed may be determined by an operator using an HMI screen or other related apparatus. In one embodiment, when a certain number of pulses have been received by the plant batch control center 43, the control system 40 will cease the operation of the first and second drive assemblies 19, 38. In one embodiment, the control system 40 will continue to operate the motor of the centrifugal fan 27 at a predetermined speed for a predetermined amount of time after the appropriate weight of bulk material has been dispensed. This continued operation of the motor of the centrifugal fan 27 may reduce the amount of time necessary to begin a subsequent operation of the dispensing system 10. Optionally, the control system 40 may cease the operation of the motor of the centrifugal fan 27 at the same time as the ceased operation of the first and second drive assemblies 19, 38.

In one embodiment, the HMI screen displays parameters and the status and operation of components of the dispensing system 10. The display may comprise information on current bulk material weight, the amount of bulk material dispensed each cycle, reverse mode status of the first drive assembly 19, the amount of pulses sent to the plant batch control center 43, status of the motors of the centrifugal fan 27, first drive assembly 19, and second drive assembly 38, status of the at least one sensor 18, pulse indicators, high or reduced speed status of the motors of the first and second drive assemblies 19, 38, duration of operation of the motor of the centrifugal fan 27, pulse resolution parameters, dispensing system 10 operational errors, low bulk material status, and voltage output signal received from the amplifier 42. In one embodiment, dispensing system 10 diagnostics may be diagnosed and resolution selected on the HMI screen. In one embodiment, test pulses may be sent to the plant batch control center 43 by an indicator on the HMI screen without having to run the dispensing system 10.

In one embodiment, the dispensing system 10 comprises at least one supplemental upper chamber, so that the dispensing system 10 can dispense more than one type of bulk material. Supplemental upper chambers may be operated in series.

The dispensing system 10 may be secured directly to its operating location or it may be a portable unit secured to a portable base. In one embodiment, the dispensing system 10 is a portable unit that is secured to a portable base that has fork pockets, such that the dispensing system 10 and its base may be moved in its entirety using a forklift or other lifting means. In one embodiment, the dispensing system 10 is equipped with a secure and permanent bar or other suitable structure attached to the legs 16 or other suitable location of the dispensing system 10, such that the dispensing system 10 may be moved in its entirety using a forklift or other lifting means.

In one embodiment, the dispensing system 10 is enclosed by a protective cover (not depicted) such as a roof or shed so that the dispensing system 10 is self-contained from the exterior environment or weather. The protective cover may comprise openings on its sides and top portion. The openings may comprise a door, a double door, a sliding door, a lid, or any other suitable closable covering. The openings may be lockable. The protective covering may be constructed primarily of a transparent material, such that the dispensing system 10 is visible from outside the protective cover.

We claim:

1. A synthetic fiber dispensing system comprising:
    an upper chamber comprising a synthetic fiber entrance configured to receive a synthetic material to be dispensed,
    a first set of at least two shafts driven by a first drive assembly and comprising fins positioned near a lower interior portion of said upper chamber, such that rotation of the first set of shafts feeds the synthetic fiber from the upper chamber downwardly,
    a lower chamber configured to receive the synthetic fiber from the upper chamber,
    a second set of at least two shafts driven by a second drive assembly and comprising fins positioned at a lower section of the lower chamber, said lower section of the lower chamber comprising sloping or vertical walls and being above and open to an exit chute, and
    wherein each of the shafts rotates in a first direction opposite to a second direction of its nearest neighbor of the shafts, and the first set of shafts are configured for synchronous oscillations between the first and second directions, each said oscillation occurring when said first set of shafts rotate between approximately 90 and approximately 180 degrees, such that a controlled dose of the synthetic fiber is dispensed downwardly with assistance of gravity into the exit chute from the lower chamber by the rotation of the second set of shafts.

2. The synthetic fiber dispensing system as in claim 1 wherein said fins of the first set of shafts are larger than said fins of the second set of shafts.

3. The synthetic fiber dispensing system as in claim 1 wherein each of the fins of the first and the second set of shafts rotate opposite an inter-fin space that separates the fins of an adjacent shaft, so that in one position during rotation each of the fins of the first and the second set of shafts momentarily bisects the inter-fin space of the adjacent shaft, such that the synthetic fiber is prevented from jamming between the fins, and the synthetic fiber is dispensed downwardly.

4. The synthetic fiber dispensing system as in claim 1 further comprising a centrifugal fan positioned adjacent to said exit chute, said exit chute located below the second set of shafts, such that the synthetic fiber is dispensed from the lower chamber into said exit chute and evacuated from said exit chute.

5. The synthetic fiber dispensing system as in claim 1 further comprising a control system.

6. The synthetic fiber dispensing system as in claim 5 further comprising at least one photo eye sensor positioned on an interior wall of the lower chamber configured sense a level of the synthetic fiber within the lower chamber and to send a first output signal to the control system controlling the first set of shafts according to said level.

7. The synthetic fiber dispensing system as in claim 5 further comprising a plurality of load cells configured to measure a weight on said first or second sets of shafts, such that said load cells are configured to send a second output signal corresponding to said weight to the control system to determine system operating parameters.

8. The synthetic fiber dispensing system as in claim 5 wherein a standalone mode operates said control system.

9. The synthetic fiber dispensing system as in claim 5 wherein a plant batch control center operates said dispensing system by communicating with said control system.

10. The synthetic fiber dispensing system as in claim 7 wherein a leveling foot on each of said load cells may be adjusted such that the second output signal of each of said load cells is approximately equal.

11. The synthetic fiber dispensing system as in claim 7 wherein the second output signal is selected from the group consisting of digital state changes, transmission control/Internet protocol TCP/IP signal, and analog signal.

12. The synthetic fiber dispensing system as in claim 1 wherein the fins of each of said first and second set of shafts have a circumference, and each of said circumferences is separate and distinct from all other said circumferences.

13. A synthetic fiber dispensing system comprising:
an upper chamber configured to receive a synthetic fiber to be dispensed;
a first set of counter-rotating shafts driven by a first drive assembly and comprising fins positioned near a lower interior portion of said upper chamber and oriented so that each fin in the first set of shafts rotates opposite an inter-fin space that separates the fins of an adjacent shaft, so that in one position each of the fins of the first set of shafts momentarily bisects said inter-fin space of the adjacent shaft, with said fins in the first set of shafts synchronously oscillating between rotating directions, such that a controlled dose of the synthetic fiber is fed from the upper chamber downwardly;
a lower chamber configured to receive the synthetic fiber from the upper chamber,
at least one sensor positioned on an interior wall of the lower chamber configured to sense a level of the synthetic fiber within the lower chamber and sending a first output signal to a control system controlling the first set of shafts according to said level;
a second set of counter-rotating shafts driven by a second drive assembly and comprising fins positioned on an interior wall of a narrowed lower section of the lower chamber and oriented so that each said fin in the second set of shafts rotates opposite an inter-fin space that separates the fins of the adjacent shaft, so that in one position each of the fins of the second set of shafts momentarily bisects said inter-fin space of the adjacent shaft, such that said synthetic fiber is dispensed from the lower chamber downwardly with the assistance of gravity to an exit chute;
a plurality of load cells configured to measure a weight on said load cells, said weight being reduced as the synthetic fiber is dispensed from the lower chamber, such that said load cells send a second output signal corresponding to said weight to the control system to determine system operating parameters; and
a centrifugal fan positioned adjacent to the exit chute, said exit chute located below the second set of shafts, such that the synthetic fiber is dispensed from the lower chamber into said exit chute and evacuated from said exit chute.

14. The synthetic fiber dispensing system as in claim 13 wherein each of said fins in the first set of shafts rotates between approximately 90 and approximately 180 degrees per oscillation.

15. The synthetic fiber dispensing system as in claim 13 wherein said control system is configured to receive commands from a plant batch control center.

* * * * *